(12) United States Patent
Dercher

(10) Patent No.: US 10,989,320 B2
(45) Date of Patent: Apr. 27, 2021

(54) CHECK VALVE FOR USE WITH SUPER ABSORBENT POLYMER

(71) Applicant: GelTech Solutions, Inc., Jupiter, FL (US)

(72) Inventor: Andrew Dercher, Jupiter, FL (US)

( * ) Notice: Subject to any disclaimer, the term of this patent is extended or adjusted under 35 U.S.C. 154(b) by 9 days.

(21) Appl. No.: 16/574,881

(22) Filed: Sep. 18, 2019

(65) Prior Publication Data

US 2020/0096125 A1 Mar. 26, 2020

Related U.S. Application Data

(60) Provisional application No. 62/736,155, filed on Sep. 25, 2018.

(51) Int. Cl.
*F16K 15/18* (2006.01)
*F16K 1/14* (2006.01)
*B24C 7/00* (2006.01)

(52) U.S. Cl.
CPC .............. *F16K 15/183* (2013.01); *B24C 7/00* (2013.01); *F16K 1/14* (2013.01); *Y10T 137/7927* (2015.04)

(58) Field of Classification Search
CPC .... F16K 15/183; F16K 1/14; Y10T 137/7927; B24C 7/00
See application file for complete search history.

(56) References Cited

U.S. PATENT DOCUMENTS

| | | | | | |
|---|---|---|---|---|---|
| 2,699,179 | A | * | 1/1955 | Hansen | G05D 7/0133 137/539 |
| 3,021,866 | A | * | 2/1962 | Handley | F16K 17/04 137/458 |
| 3,213,949 | A | * | 10/1965 | Kistler, Jr. | E21B 10/61 175/232 |
| 3,417,776 | A | * | 12/1968 | Milton | F16K 17/00 137/512.5 |
| 3,854,557 | A | * | 12/1974 | Wilcox | F16F 9/3415 188/322.15 |
| 4,681,139 | A | * | 7/1987 | Falconer | F16K 15/046 137/537 |
| 2001/0025941 | A1 | * | 10/2001 | Smith, Jr. | F16K 25/005 251/174 |
| 2006/0027771 | A1 | * | 2/2006 | Baumann | F16K 1/52 251/119 |

* cited by examiner

*Primary Examiner* — Kevin R Barss

(57) ABSTRACT

A check valve formed from a body having inlet and outlet interior chambers with the outlet chamber functioning as a diffuser when assisting in the arrest of reverse water flow. A seat base is positioned between the inlet and outlet chambers with a tubular sleeve for housing a stem having a lip positioned along one end and a threaded opposite end secured within the inlet chamber. A spring fits around the stem and a sphere is secured to the threaded end of the stem for engaging the seat base. Movement of the sphere away from the inlet chamber allows dry polymer to pass when the spring is compressed. Upon loss of force capable of moving the sphere away from the inlet chamber, relaxation of the spring allows the sphere to engage the seat base with an attached grommet before water can flow backwards into the interior chamber.

8 Claims, 4 Drawing Sheets

CHECK VALVE FOR USE WITH SUPER ABSORBENT POLYMER

PRIORITY CLAIM

In accordance with 37 C.F.R. 1.76, a claim of priority is included in an Application Data Sheet filed concurrently herewith. Accordingly the present invention claims priority to U.S. Provisional Patent Application No. 62/736,155, entitled "Check Valve for use with super hydrated polymers, filed Sep. 25, 2018. The contents of the above referenced applications are incorporated herein by reference.

FIELD OF THE INVENTION

The present invention relates to the field of fluid mechanics, specifically to a vacuum-actuated check valve adapted for use with super absorbent polymers.

BACKGROUND OF THE INVENTION

Currently existing check valves are suitable for a variety of applications. A conventional check valve is used to control fluid flow through a hose or pipe. More specifically, a conventional check valve allows for flow in one direction while preventing flow in the opposite direction. As the fluid enters the check valve in the direction of desired flow with enough pressure to overcome the check valve closure mechanism, a ball, disc or flapper closure element is displaced from a normally closed position. Displacement of the closure element from its normally closed position allows fluid to pass through the check valve. When the pressure of the fluid is less than the pressure required to overcome the check valve closure mechanism, the check valve closure element remains in the closed position. While the check valve closure element is in the closed position, flow in both the forward and reverse directions is prevented. A conventional spring-loaded ball, disc, or flapper check valve works well with particulate free fluids. When a conventional check valve is used with fluids containing particulates, the particulates can gather around the closure element and inhibit proper sealing. Without proper sealing, flow in the reverse direction becomes possible, thus defeating the purpose of the check valve.

Malfunction of the check valve could lead to undesired reversal of flow direction. Various attempts to address the use of check valves with dry material or the like particulates have been made. For example, a flapper check valve contains a spring-loaded plate that allows fluid flow in one direction while preventing fluid flow in the opposite direction. The flapper hinged along one edge allows the flapper to close with a diminishing side edge in order to prevent flow in the direction opposite to the desired direction of flow. While each of the closure elements have benefits, all known check valves can still malfunction as there is no provision to guarantee unperturbed function of the closure element seat.

A particular problem to be addressed is the flow of dry material, namely non-hydrated super absorbent polymers, through a flow path directed into an accelerated water stream. As the water stream is accelerated through an eductor, the ensuing pressure drop in the water stream causes a pressure drop in the polymer flow path. The aforementioned polymer flow path pressure drop draws polymer into the water stream. Upon abrupt downstream closure of the water stream flow path, pressurized water attempts to enter the polymer flow path. Closure of the polymer flow path prior to water entry is paramount to preventing premature hydration of the polymer and the resulting clogging of the polymer flow path. Therefore, it is critical to prevent reverse flow in the polymer flow path.

SUMMARY OF THE INVENTION

The present invention addresses the aforementioned flow reversal issue by providing a check valve capable of maintaining proper functionality so as to prevent water entry into the polymer flow path. Check valve characteristics that allow for such functionality include a smoothened and rounded stopping mechanism that allows for enhanced flow, and ultimately clearance, of polymer through the check valve. Furthermore, a diffuser on the downstream side of the check valve allows additional time for the hall inside of the check valve to resent prior to water entry into the polymer flow path.

In accordance with the present disclosure, the present invention is a check valve for use in a system for drawing dry polymer. The check valve consists of a body formed from a continuous side wall having an inlet and an outlet. The inlet and outlet chambers are either coupled or de-coupled when the check valve is in the open or closed position, respectively. While de-coupled, the inlet and outlet chambers are isolated from each other by a ball that serves as the closure element of the mechanism responsible for opening and closure of the pathway through the check valve. Flow from the inlet chamber to the outlet chamber is accelerated by a funnel at the bottom of the inlet chamber just prior to transfer into the outlet chamber.

Located at the bottom of the outlet chamber is another conical flow path that functions to accelerate flow in the desired direction of flow while decelerating flow in the opposite direction. Because the funnel at the bottom of the outlet chamber functions as a diffuser when fluid flow occurs in the opposite direction of desired flow, additional time is provided for closure of the check valve prior to undesired flow from the outlet chamber to the inlet chamber. Furthermore, reverse flow is stopped when the ball retracts against a rubber seat capable of sealing off flow between the outlet and inlet chambers. Movement of the hall inside of the check valve is made possible by a spring wrapped around a stem with an enlarged head that rests inside of a tubular sleeve with a flat platform suspended within the inlet chamber.

The check valve ball that serves as the moveable barrier preventing reverse flow from the outlet chamber to the inlet chamber is connected to the stem by a threaded connection. As the pressure in the outlet chamber decreases, the ball is pulled away from the inner chamber, thus compressing the spring around the stem. As the pressure in the outlet chamber rises, the ball is retracted back towards the inlet chamber as the spring returns towards its resting position. The check valve allows the dry polymer to pass from the inlet chamber to the outlet chamber and through the outlet when the spring is compressed. As the spring is relaxed the reduction of spring compression allows the ball to engage the seat base before water can enter the inlet chamber.

An objective of the invention is to prevent a reverse flow of water through a check valve used in a dry polymer eductor system.

Still another objective of the invention is to disclose the use of a diffuser incorporated into a check valve that decelerates fluid flow, thus providing time for the check valve ball seat in order to prevent fluid back flow.

Another objective of the invention is to provide a check valve that can be easily inspected and cleaned.

Still another objective of the invention is to provide a check valve with a removable stem assembly, thus allowing ease of assembly and maintenance.

Yet still another objective of the invention is to provide a check valve entirely constructed of 6061-T6 aluminum, excluding a spring, seal and O-rings for threaded National Pipe Straight Mechanical (NPSM) connections.

Other objectives and advantages of this invention will become apparent from the following description taken in conjunction with any accompanying drawings of this invention. Any drawings contained herein constitute a part of this specification, include exemplary embodiments of the present invention, and illustrate various objects and features thereof.

DETAILED DESCRIPTION OF THE INVENTION

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting. Rather, they are to be treated as a basis for the claims and as a representative foundation for teaching one skilled in the art to employ the present invention in various appropriately detailed structures.

A hydrated super absorbent polymer admixture is known to have substantially superior fire suppression and extinguishing properties relative to plain water. One of the unique properties of the admixture is its ability to adhere to objects to which it has been applied and create an impedance to deflagration.

Mixing of a super absorbent polymer with water, prior to distribution, typically results in a slurry capable of clogging pipes. The super absorbent polymer is transported in a dry state and drawn into a fluid flow line by use of an eductor. It is imperative that the fluid does not contact the polymer until it is passing through a fluid inlet. The purpose of the check valve of the instant invention is to prevent fluid from backing into the polymer before the fluid inlet. Thus, the present invention is meant to serve as an effective and easy-to-use device for preventing super absorbent polymer from contact with fluid prior to the appropriate mixing intersection. The polymer used with the instant invention contains water binding groups with a particle size from 1-300 microns. The polymer is capable of absorbing water up to several hundred times its own weight. If kept in a dry and relatively cool state, the polymer has an infinite shelf life. If the polymer is hydrated at an inappropriate time, the polymer cannot be drawn through an eductor or pump. The super absorbent polymer is mixed with water in an amount sufficient to suppress a variety of fires and is currently marketed under the brand name FIREICE®.

Figure 1:
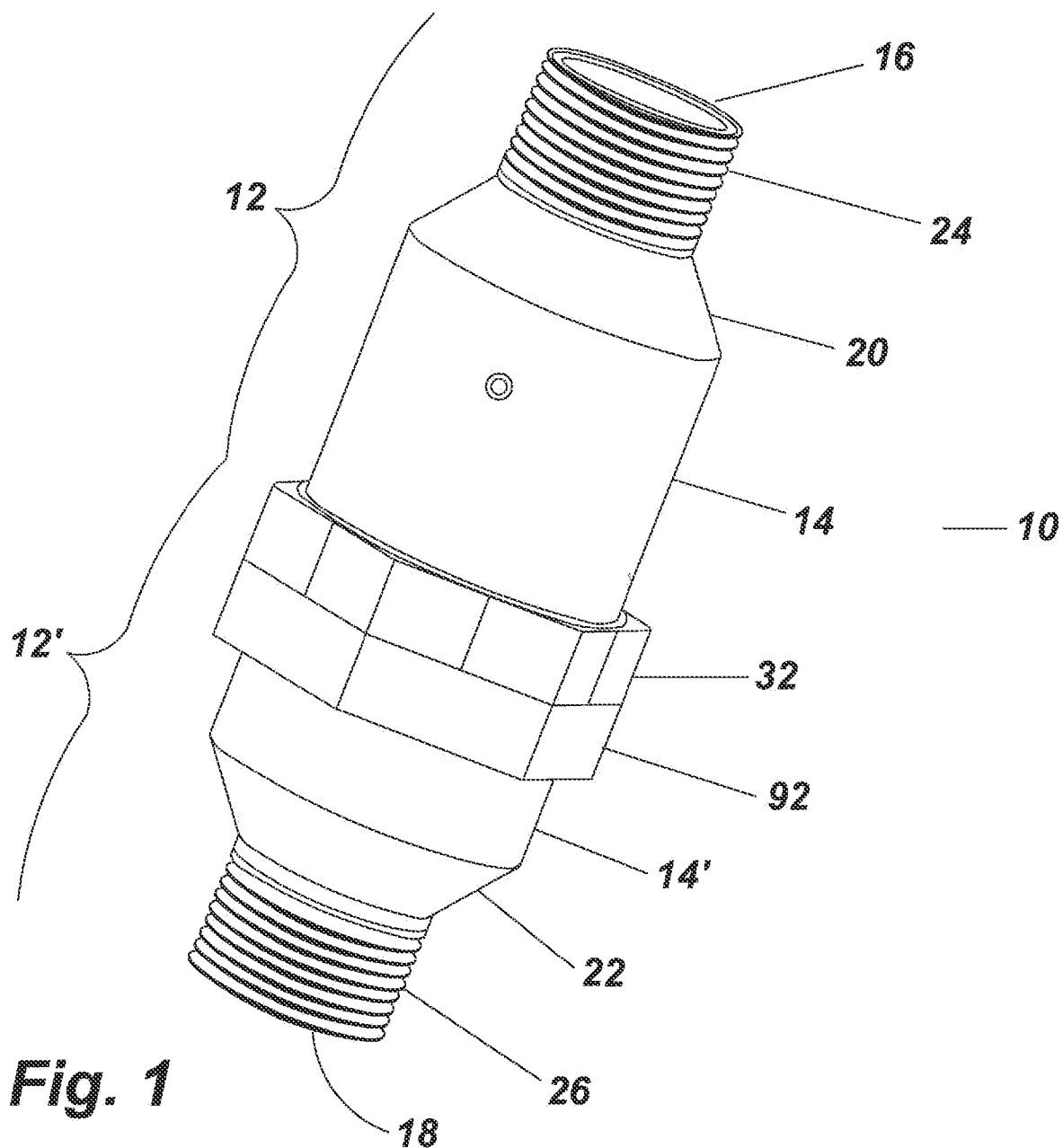
FIG. 1 is a plane view illustrating a check valve of the present invention.

Depicted in FIG. 1 is the check valve 10 having an inlet chamber 12 and an outlet chamber 12' with a 1.08-inch inner diameter inlet 16 and a 1.08-inch inner diameter outlet 18.

In the preferred embodiment, the inlet 16 and outlet 18 have a diameter smaller than the diameter of continuous side walls 14 and 14'.

A conical shaped side wall 20 is positioned between the inlet 16 and the continuous side wall 14. In addition, the outlet chamber 12' has a conical shaped side wall 22 positioned between side wall 14' and the outlet 18. The conical shaped side wall 22 is designed with a predetermined slope in order to function as a nozzle while assisting in polymer flow and a diffuser while arresting water flow in the opposite direction of polymer flow.

In the preferred embodiment, the inlet 16 is threaded with 1.0-inch male National Pipe Taper (NPT) threads 24. The side walls 14 and 14' have a 2.125-inch outer diameter. The outlet 18 is threaded with 1.0-inch male NPT threads 26. The inlet chamber 12 consists of the threaded inlet 16 machined to conical side wall 20. Conical side wall 20 connects to continuous sidewall 14 via machined threads 28 shown in FIG. 2. A wrench base 32 is machined around conical inner wall 34. Machined threads 36 connect side wall 14 to wrench base 32 and its accompanying conical inner wall 34. Conical inner wall 34 leads into seat aperture 38 at an angle of about 45 degrees. Attached to conical inner wall 34 are 1.5-inch male NPSM threads 40, which connect inlet chamber 12 to outlet chamber 12'. A 1.5-inch NPSM O-ring 42 is secured around the beveled base 44 of the 1.5-inch male NPSM threads 40 in order to form a water-tight seal when inlet chamber 12 is connected to outlet chamber 12'. Side wall 14' contains 1.5-inch female NPSM threads 40' with raceway 46 in order to properly accommodate 1.5-inch male NPSM threads 40 and O-Ring 42, respectively, to create a water-tight seal when inlet chamber 12 is connected to outlet chamber 12'.

Figure 3:
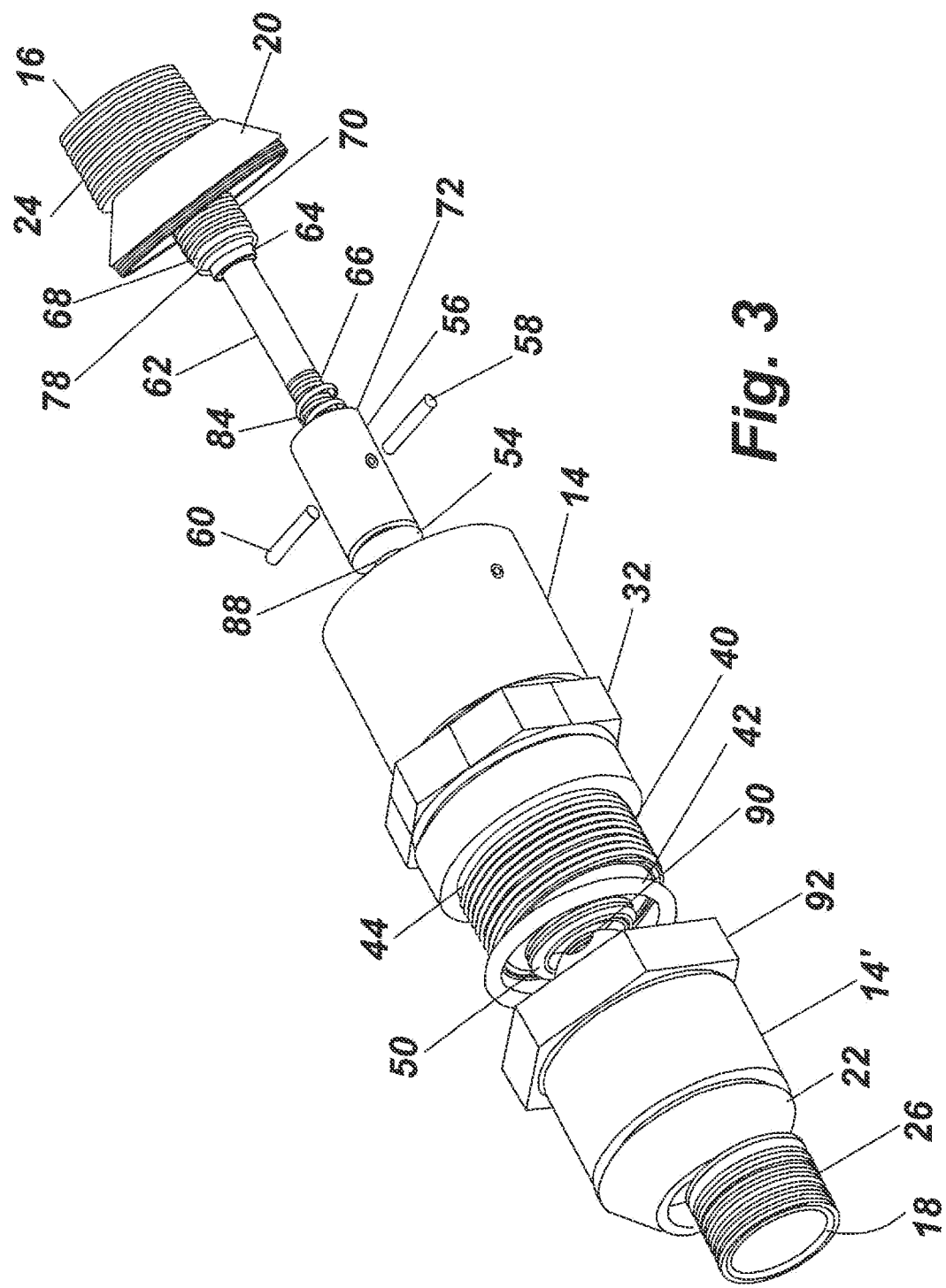
FIG. 3 is an exploded view of FIG. 1.

The conical side wall 34 leading to the seat aperture 38 is designed to allow for the acceleration of polymer from the inlet chamber to the outlet chamber. Polymer can only pass from the inlet chamber to the outlet chamber when sphere 48 is displaced away from seat aperture 38 and can no longer create a seal with grommet 50, which rests within seat aperture 38. While sphere 48 creates a seal with grommet 50, water cannot move from outlet chamber 12' to inlet chamber 12. Movement of sphere 48 is made possible by sleeve assembly 52 into which an annular hemispherical cup base 54 is machined. As shown in FIG. 3, sleeve assembly 52 consists of a tubular shaped sleeve 56, which is positioned inside inlet chamber 12. Sleeve 56 is secured to the side wall 14 by support bars 58 and 60, which are machined into side wall 14 and sleeve 56. A stem 62 consists of a lip 64 positioned at one end of the stem 62 along with ¹⁄₁₆-inch male NPT threads 66 positioned along the other end of the stem 62. The stem 62 is capable of sliding within the sleeve 56 and is hollow between the entry to the lip 64 and base of the threads 66.

Figure 4:
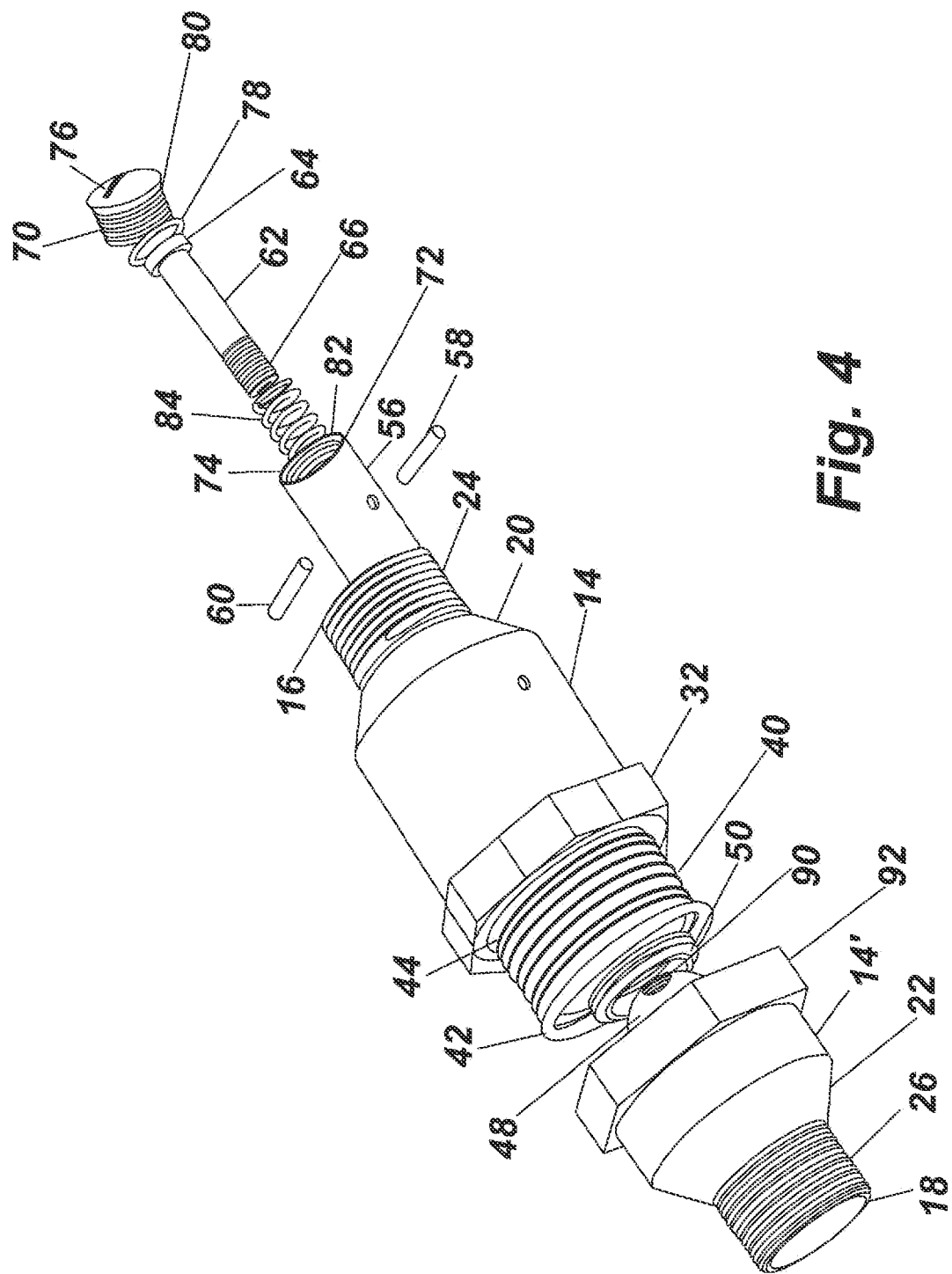
FIG. 4 is a partially exploded view of FIG. 1.

As shown in FIG. 4, sleeve assembly cap 68 has ⅜-inch male NPSM threads 70 for engagement into the threaded end 72 of the sleeve assembly 48 that contains ⅜-inch female NPSM threads 74. Sleeve assembly cap 68 has a slotted top 76 for receipt of a standard screwdriver, allowing for ease of removal of the stem 62 from the sleeve 56 should servicing be required. When joining sleeve assembly cap 68 to sleeve 56, the sleeve 56 is sealed by a ⅜-inch O-Ring 78 that fits around the beveled base 80 of sleeve assembly cap 68 and seats into sleeve chamfer 82. A spring 84 is positioned around the stem 62. The spring is about 0.039 inches thick with a length of about 0.625". In the preferred embodiment, the spring 84 has a predetermined spring coefficient.

Figure 2:
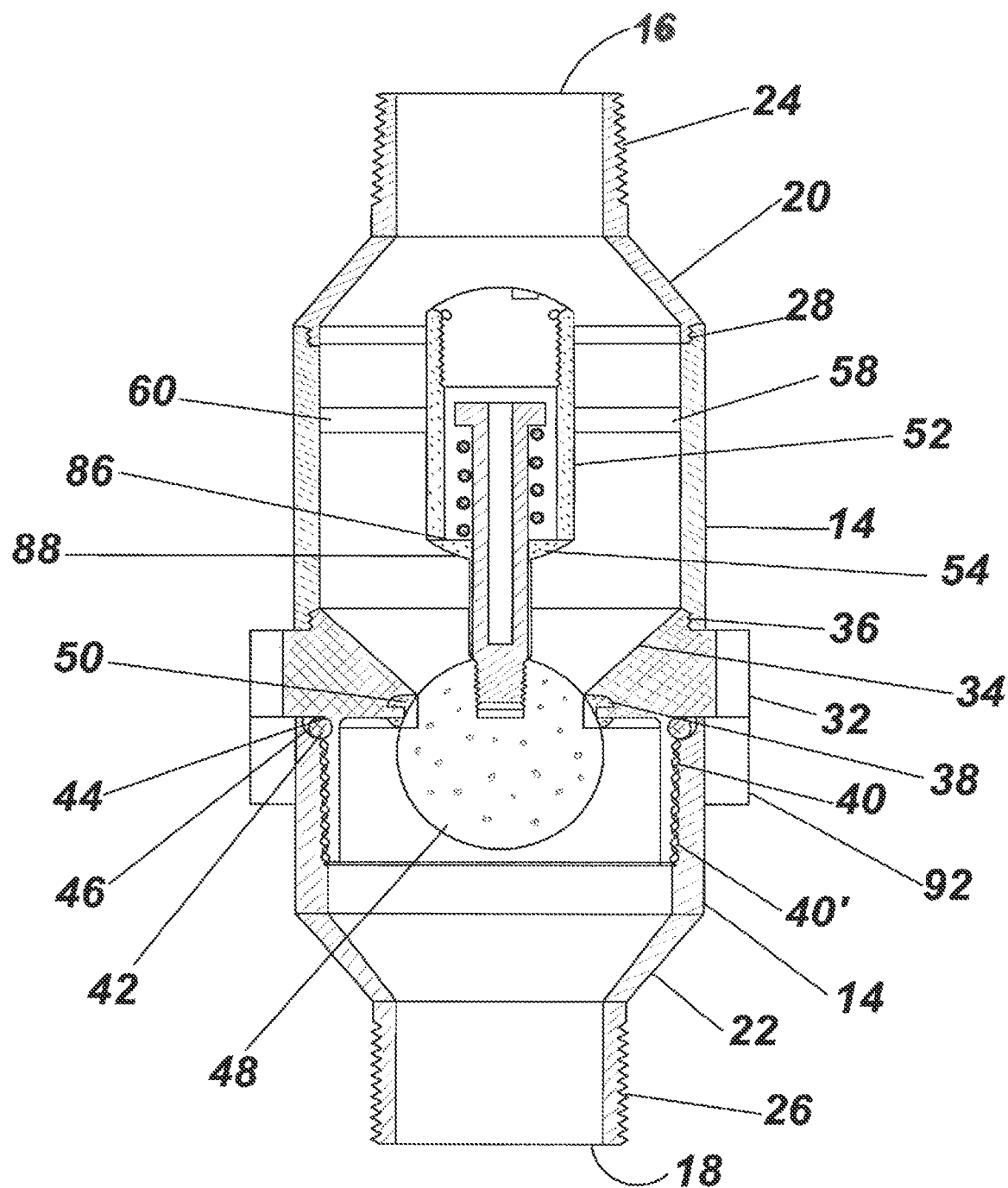
FIG. 2 is a cross section of FIG. 1.

As shown in FIG. 2, a cup base 54 with a flat inner platform 86 and hole 88 is machined into one end of the sleeve and provides axial alignment of the stem 62 as well as a platform upon which spring 84 may rest. Platform 86 allows spring 84 to compress or expand, thus allowing for movement of the sphere 48 into an open position away from grommet 50 while a vacuum exists in outlet chamber 12' or a seated position against grommet 50 while a positive fluid pressure exists in outlet chamber 12'. The stem 62 has $\frac{1}{16}$-inch male NPT threads 66 to engage a $\frac{1}{16}$-inch female NPT threaded socket 90 formed in the sphere 48. The sphere 48 in the embodiment depicted has a diameter of 1.0625".

The outlet chamber 12' consists of a side wall 14' having an internal 1.5-inch female NPSM thread 40. A lower wrench base 92 is machined into side wall 14'. Conical side wall 22 has a predetermined angular slope of about 55 degrees designed to operate as a diffuser to assist in the arrest of fluid attempting to flow from the outlet chamber 12' to the inlet chamber 12. The conical side wall 22 is machined into threaded outlet 18.

In the preferred embodiment, the check valve 10 of the instant invention has a seat base 38 sized to pass polymer material at a flow rate up to about 25 lb. per minute, based upon an eductor drawing polymer through the inlet 16 for passage through the outlet 18. The check valve 10 is designed for placement in an eductor based system, wherein the inlet 16 is coupled to a source of dry polymer. The outlet 18 is coupled to an eductor that is used in combination with a pressurized flow of water. When water flows through the eductor, a vacuum is drawn upon the check valve 10, causing the spring to compress and allowing the sphere 48 to be displaced from its normal closed position against the grommet 50. Displacement of sphere allows the polymer to be drawn through the check valve, wherein the polymer is admixed with the water stream. When the flow of water is interrupted, a loss of vacuum at the outlet 18 occurs and the sphere 48 is reseated against the grommet 50. The conical side wall 22 operates as a diffuser to cause a momentary delay of fluid backing into the check valve 10 to assure the sphere 48 is seated before water can hydrate any polymer in the upper body 12 of the check valve 10. The construction material for the check valve 10 is preferably 6061-T6 aluminum.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. The term "about" means, in general, the stated value plus or minus 5%.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the aforementioned objectives, ends and advantages as well as those inherent therein. The embodiments, methods, procedures and techniques described herein are presently representative of the preferred embodiments, are intended to be exemplary, and are not intended as limitations on the scope. Changes therein and other uses will occur to those skilled in the art, which are encompassed within the spirit of the invention and are defined by the scope of the appended claims. Although the invention has been described in connection with specific preferred embodiments, it should be understood that the invention, as claimed, should not be unduly limited to such specific embodiments. Indeed, various modifications of the described modes for carrying out the invention, which are obvious to those skilled in the art, are intended to be within the scope of the following claims.

What is claimed is:

1. A check valve comprising:
   a body formed from a continuous side wall having an inlet and an outlet forming two interior chambers therebetween, said outlet having a conical shaped lower side wall constructed and arranged to act as a diffuser;
   a seat base formed from an angular shaped sidewall extending from said continuous side wall to a centrally disposed opening;
   a tubular shaped sleeve positioned in said interior inlet chamber secured to said continuous side wall;
   a platform positioned within one end of said sleeve upon which a spring rests and through which a stem may traverse;
   a stem with an enlarged lip on one end and a threaded opposite end, positioned within the aforementioned tubular sleeve;
   a spring constructed and arranged to fit around said stem and between said tubular sleeve platform and said enlarged lip of said stem, said spring having a predetermined spring tension; and
   a sphere having a diameter secured to said threaded end of said stem, said sphere having a diameter that is greater than a diameter of said seat base;
   whereby said check valve is positioned between a source of dry material and water, allowing said dry material to pass forward through the check valve for mixing with an accelerated water stream when said spring is compressed and prevents a backflow of water through the check valve when said spring is relaxed, wherein said diffuser is constructed and arranged to momentarily inhibit the backflow of water until said ball is positioned in said seat base.

2. The check valve according to claim 1 wherein said angular shaped sidewall at the lower end of the inlet chamber is sloped to provide an accelerated flow of dry material through said seat base.

3. The check valve according to claim 2 wherein said angular shaped side wall slope is about 45 degrees forming a funnel shape wherein said slope clears material buildup that would otherwise clog the flow of material between said inlet and said outlet.

4. The check valve according to claim 1 wherein said body, said stem, and said sphere are constructed from 6061-T6 aluminum.

5. The check valve according to claim 1 including a rubber grommet attached to said seat base, said rubber grommet allowing said sphere to seal said seat base with minimal spring pressure.

6. The check valve according to claim 1 wherein said conical shaped diffuser having a side wall angular slope constructed and arranged to decelerate the fluid.

7. The check valve according to claim 1 wherein said angular slope is about 55 degrees.

8. The check valve according to claim 1 wherein said inlet, said outlet, and said sphere are each about 1.0625 inches in diameter, allowing said check valve to pass dry material consisting of polymer at a flow rate up to about 25 lbs. per minute.

* * * * *